July 5, 1932.  A. W. GARDINER  1,865,849
COMBUSTION CHAMBER FOR INTERNAL COMBUSTION ENGINES
Filed March 3, 1930
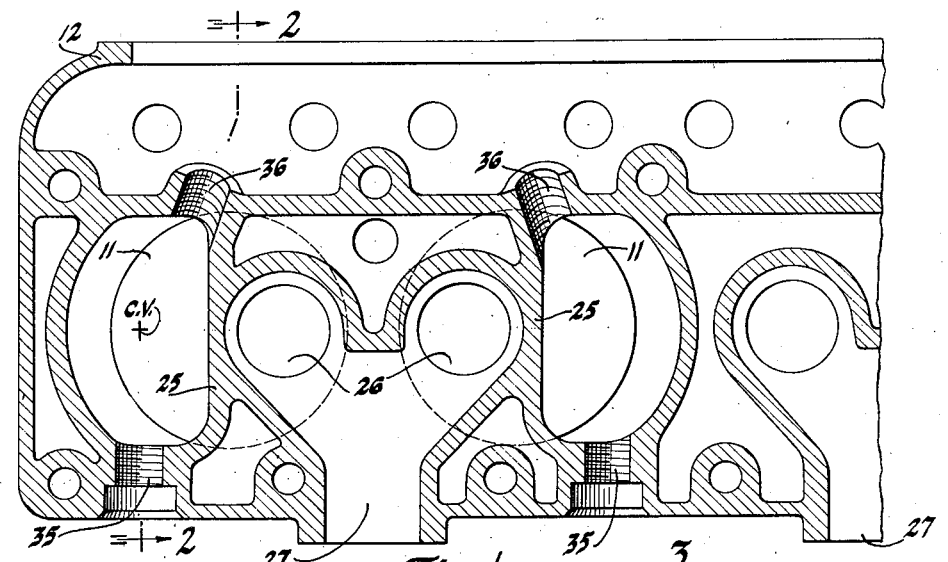
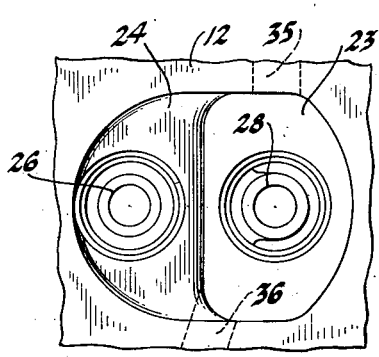
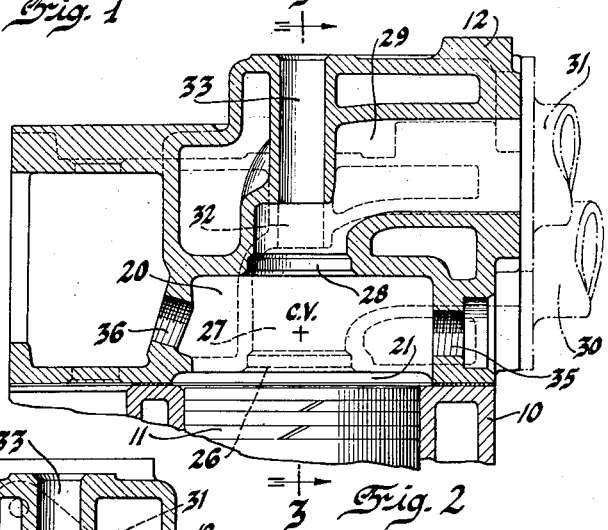
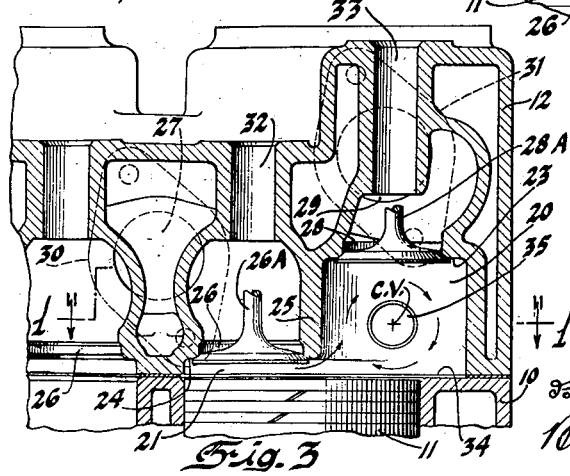
Inventor
Arthur W. Gardiner Patented July 5, 1932

1,865,849

UNITED STATES PATENT OFFICE

ARTHUR W. GARDINER, OF DETROIT, MICHIGAN, ASSIGNOR TO GENERAL MOTORS RESEARCH CORPORATION, OF DETROIT, MICHIGAN, A CORPORATION OF DELAWARE

COMBUSTION CHAMBER FOR INTERNAL COMBUSTION ENGINES

Application filed March 3, 1930. Serial No. 432,795.

This invention relates to combustion chambers for internal combustion reciprocating piston engines of the so called overhead valve type, wherein the inlet and outlet ports are in the roof of the chamber opposite the pressure face of the piston whatever the position of the engine may be in space.

Among the objects of the invention are: to induce turbulence in the air and fuel charge immediately prior to and during combustion; to prevent overheating of the exhaust valve; to allow unhampered entry of the air and fuel mixture thereby making possible high volumetric efficiency; to enable ignition to be initiated at a point or points favorable to high power output and avoidance of detonation; to cool effectively the last part of the charge to burn, and otherwise to improve engine performance.

The objects of the invention are achieved by means of the engine head, included combustion chamber and appurtenances illustrated in the accompanying drawing in which:

Fig. 1 is a section through a fragment of a head for a multicylinder engine taken on a plane perpendicular to the cylinder axis, as represented by line 1—1 in Fig. 3.

Fig. 2 is a transverse section on broken planes, parallel with the cylinder axis, as represented by the line 2—2 in Fig. 1.

Fig. 3 is a longitudinal section on a plane at right angles to that of Fig. 2, parallel with the cylinder axes and intersecting both valve ports, as represented by line 3—3 in Fig. 2, and Fig. 4 is an inverted plan of a fragment of the head containing the combustion chamber.

A cylinder block, shown fragmentarily in Figs. 2 and 3, is indicated by 10 and one of the pistons by 11; a cylinder head is indicated in general by 12. The head is cast with combustion chamber cavities, water circulating passages mixture intake, and burnt gas outlet ports and ways: valve seats, valve stem guides, ignition plug orifices and other necessary parts and appurtenances. Valve seats and valve stem guides, and ignition plug orifices are, of course, suitably machined, as are the surfaces which register with the cylinder block, intake and exhaust pipes or manifolds.

The combustion chamber, here illustrated as included in a detachable head, consists of a major portion 20 of relatively small ratio of surface to volume and of relatively great depth measured from the compression surface of the piston at the end of the compression stroke, and a minor portion 21 of small depth and very large ratio of surface to volume relatively to the corresponding dimensions of the major portion. The roof of the chamber is stepped down from the roof portion 23 of the major portion to the roof portion 24 of the minor portion by the riser wall 25. Port 26 opens into the minor portion from passage 27, and port 28 opens from the major portion into passage 29. A suitable conduit 30 communicates with the passage 27 and another suitable conduit 31 communicates with passage 29. Ports 26 and 28 are controlled by poppet valves 26A and 28A adapted to be operated in proper time relation by mechanism (not shown) usual in overhead valve engines, their stems being guided in guideways 32 and 33.

In order to afford space for adequate volume of mixture the major portion 20 of the combustion chamber is shown as overlapping the cylinder at 34 in a direction longitudinal of the block and at the side of the cylinder opposite the shallow minor portion 21. By longitudinal is meant lengthwise of the engine or parallel with the axis of the engine shaft.

Threaded orifices 35 and 36 for the reception of ignition plugs are disposed in the longitudinal side walls of major portion 20 of the chamber. Two plugs may be used for dual ignition purposes if desired, or one for single ignition. In the latter case the orifice not occupied by an ignition plug may be closed by a threaded stopper. The center of volume of the combustion chamber is approximately at the cross mark $cv$ in the major portion 20 shown in Figs. 1, 2 and 3. Either plug may, if desired, be adapted to be screwed toward the center of volume to bring the electrodes as near as may be desired to that center, as the axes of the orifices approximately intersect it.

The valves are arranged, as shown, substantially in a plane which includes the cylinder axis. This enables the valve rocker shaft (not shown) to extend parallel with the engine crankshaft or longitudinally of the engine, for convenience of operation. In multicylinder engines the combustion chambers may be arranged in pairs with the shallow chamber portions 21 juxtaposed. This allows both ports 26 to communicate with a single passage 27. And when the ports 26 are used as intake ports, as is preferred, cooling of the mixture in the shallow portions 21 of the chamber is facilitated.

Assuming ports 26 to be the intake ports, said port 26 of each cylinder is opened on the intake stroke of the piston. Combustible mixture is then pumped into the cylinder by the piston in a direct course unhindered by any obstruction or change of course. The inertia of the moving mass of combustible mixture entering the cylinder, and of that behind it, fills the cylinder with mixture under pressure slightly higher than atmospheric pressure, thus contributing to high volumetric efficiency. The burnt residue of the previous charge tends to gather in the major portion 20 of the combustion chamber. When the piston starts back on its compression stroke the mixture is caused to flow into the major portion 20 and move turbulently past the exhaust valve as indicated by the arrows in Fig. 3. This turbulent flow of fresh mixture tends to cool the exhaust valve and to mix thoroughly the small residue of burnt gas with the fresh mixture. Ignition takes place while the mixture is in rapid motion. Owing to the position of the ignition point in the major portion of the combustion chamber, somewhere near the center of volume, the average flame travel is short while the last of the mixture to burn is that lying within the minor portion 21 of the chamber; and this is cooled by reason of the large surface area adjacent the cooling water and adjacent the cool incoming charge. Improved power output is thus obtained with minimum detonation.

While I have shown and described one specific embodiment of my invention it is not intended that protection shall be limited thereto, but only by the scope of the appended claims.

I claim:

1. In an internal combustion engine having a cylinder and reciprocating piston, a cylinder head comprising a combustion chamber having a major portion of large ratio of volume to wall surface and a minor portion of small ratio of volume to wall surface, with respect one to the other, a valve port in the roof of the minor portion and a valve port in the roof of the major portion, said valve ports being disposed side by side in a plane substantially parallel with the cylinder axes and longitudinal of the engine.

2. In an internal combustion engine, a combustion chamber as defined in claim 1 having an ignition plug orifice disposed in the side wall of the major portion of the chamber so that its axis extended approximately intersects the center of volume.

3. In an internal combustion engine having a block comprising a plurality of cylinders arranged side by side and pistons in said cylinders, a multiple cylinder head comprising combustion chambers each having a major portion of large ratio of volume to wall surface and a minor portion of small ratio of volume to wall surface, with respect one to the other, an intake valve port in the roof of the minor portion, and an outlet valve port in the roof of the major portion, said ports being disposed side by side in a plane substantially parallel to the cylinder axis and longitudinal of the engine; the chambers being arranged in pairs with the minor portions of the combustion chambers adjacent to one another.

4. In an internal combustion engine comprising a cylinder and piston, the closed end of the cylinder enclosing a combustion chamber having a major portion of large ratio of volume to wall surface and a minor portion of small ratio of volume to wall surface with respect one to the other; the minor portion being disposed over the piston and the major portion extending longitudinally of the engine away from the minor portion beyond the cylinder bore.

In testimony whereof I affix my signature.

ARTHUR W. GARDINER.